(12) United States Patent
Dottax et al.

(10) Patent No.: US 11,526,880 B2
(45) Date of Patent: Dec. 13, 2022

(54) DYNAMIC SECURITY CODE FOR A CARD TRANSACTION

(71) Applicant: IDEMIA FRANCE, Courbevoie (FR)

(72) Inventors: Emmanuelle Dottax, Courbevoie (FR); Paul Dischamp, Courbevoie (FR)

(73) Assignee: IDEMIA FRANCE, Colombes (FR)

( * ) Notice: Subject to any disclaimer, the term of this patent is extended or adjusted under 35 U.S.C. 154(b) by 47 days.

(21) Appl. No.: 16/322,578

(22) PCT Filed: Jul. 27, 2017

(86) PCT No.: PCT/EP2017/069092
§ 371 (c)(1),
(2) Date: Feb. 1, 2019

(87) PCT Pub. No.: WO2018/024616
PCT Pub. Date: Feb. 8, 2018

(65) Prior Publication Data
US 2019/0172058 A1 Jun. 6, 2019

(30) Foreign Application Priority Data
Aug. 2, 2016 (EP) .................. 16306002

(51) Int. Cl.
*G06Q 20/32* (2012.01)
*G06Q 20/38* (2012.01)
(Continued)

(52) U.S. Cl.
CPC ....... *G06Q 20/385* (2013.01); *G06Q 20/3223* (2013.01); *G06Q 20/341* (2013.01);
(Continued)

(58) Field of Classification Search
USPC .......................................... 705/44
See application file for complete search history.

(56) References Cited

U.S. PATENT DOCUMENTS 8,577,803 B2 * 11/2013 Chatterjee ............ G06Q 20/386
705/41
9,530,125 B2 * 12/2016 Bacastow .............. G06Q 20/36
(Continued)

FOREIGN PATENT DOCUMENTS

| WO | 2007/149830 A2 | 12/2007 | |
|---|---|---|---|
| WO | 2009/026365 A2 | 2/2009 | |
| WO | WO-2014022778 A1 * | 2/2014 | ........... G06F 21/606 |

OTHER PUBLICATIONS

Dubois et al., Dynamic Security Codes: A Primer, Mar. 23, 2021, Secure Technology Alliance, (https://www.securetechalliance.org/wp-content/uploads/Dynamic-Security-Code-Cards-Webinar-FINAL-Mar-23-2021.pdf) (Year: 2021).*

(Continued)

*Primary Examiner* — Paul S Schwarzenberg
(74) *Attorney, Agent, or Firm* — Nixon & Vanderhye

(57) ABSTRACT

An electronic device generates a dynamic security code for a card transaction, e.g. a card not present transaction. The electronic device receives a user request to generate a dynamic security code. The electronic device sends a time request to a time source and receives a message including a time from the time source. The electronic device determines an authenticity of the message containing the time and computes the dynamic security code based on the time received in the message and a key stored at the electronic device. The electronic device causes the dynamic security code to be displayed on a display of the electronic device. The electronic device may be capable of computing a dynamic security code for a plurality of different cards. The electronic device may be a smart phone, a tablet, or a personal computer.

18 Claims, 14 Drawing Sheets

(51) Int. Cl.
  *G06Q 20/40* (2012.01)
  *G06Q 20/34* (2012.01)
(52) U.S. Cl.
  CPC ..... *G06Q 20/3829* (2013.01); *G06Q 20/4018* (2013.01); *G06Q 20/3265* (2020.05)

(56) References Cited

U.S. PATENT DOCUMENTS

| | | | |
|---|---|---|---|
| 9,646,303 B2* | 5/2017 | Karpenko | G06Q 20/3278 |
| 9,947,001 B2* | 4/2018 | Smith | G06Q 20/3227 |
| 10,116,447 B2* | 10/2018 | Gordon | H04L 9/3297 |
| 10,223,694 B2* | 3/2019 | Makhotin | G06Q 20/02 |
| 10,572,873 B2* | 2/2020 | Tanner | G06Q 20/322 |
| 2007/0136211 A1 | 6/2007 | Brown et al. | |
| 2011/0225089 A1* | 9/2011 | Hammad | G06Q 20/4018 |
| | | | 705/44 |
| 2012/0153028 A1 | 6/2012 | Poznansky et al. | |
| 2014/0279555 A1 | 9/2014 | Guillaud | |
| 2016/0148194 A1* | 5/2016 | Guillaud | G07F 7/0846 |
| | | | 705/44 |
| 2016/0162883 A1 | 6/2016 | Liscia et al. | |

OTHER PUBLICATIONS

International Search Report, dated Sep. 21, 2017, from corresponding PCT/EP2017/069092 application.

\* cited by examiner

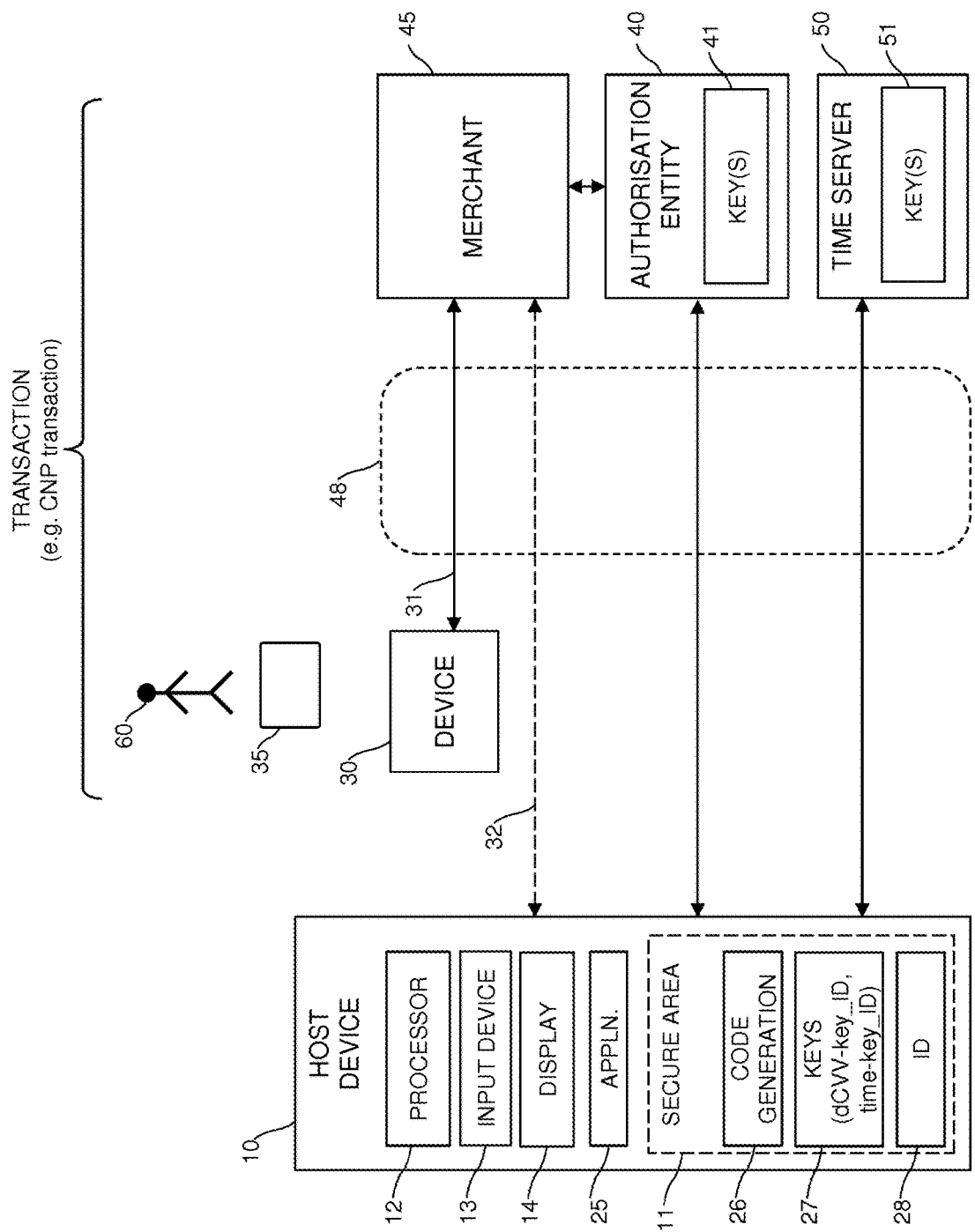

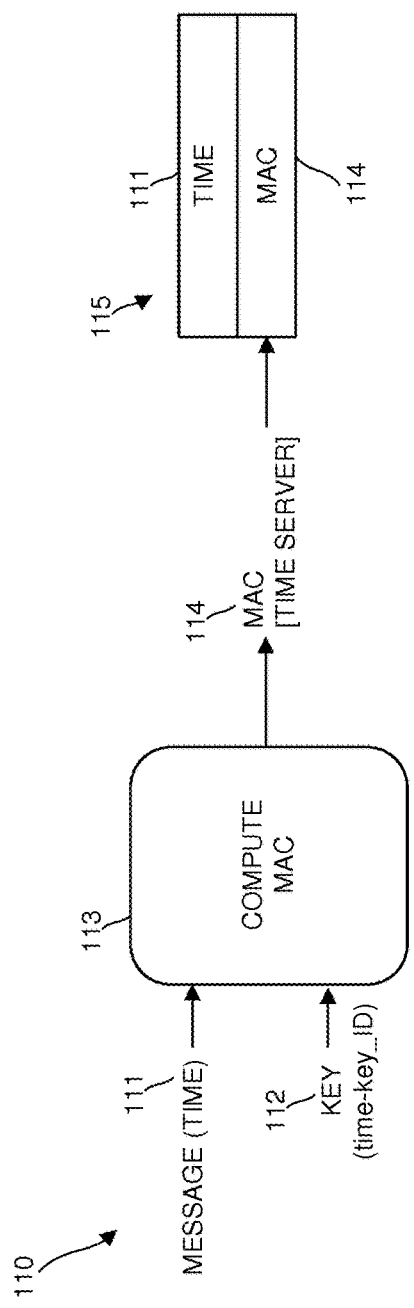
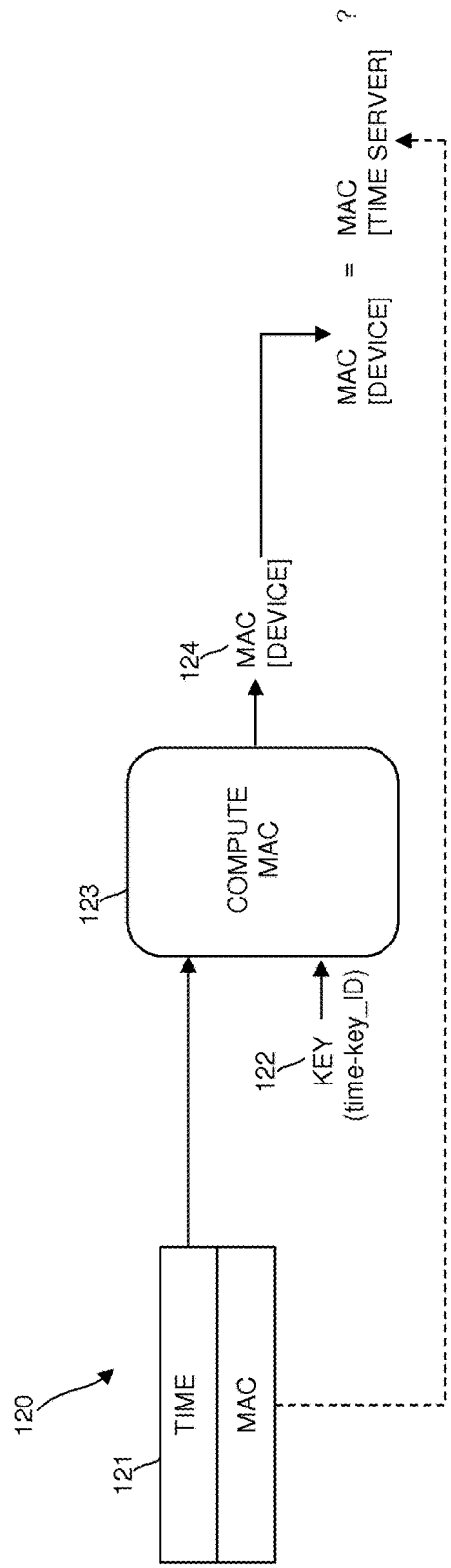
Fig. 5
Fig. 6

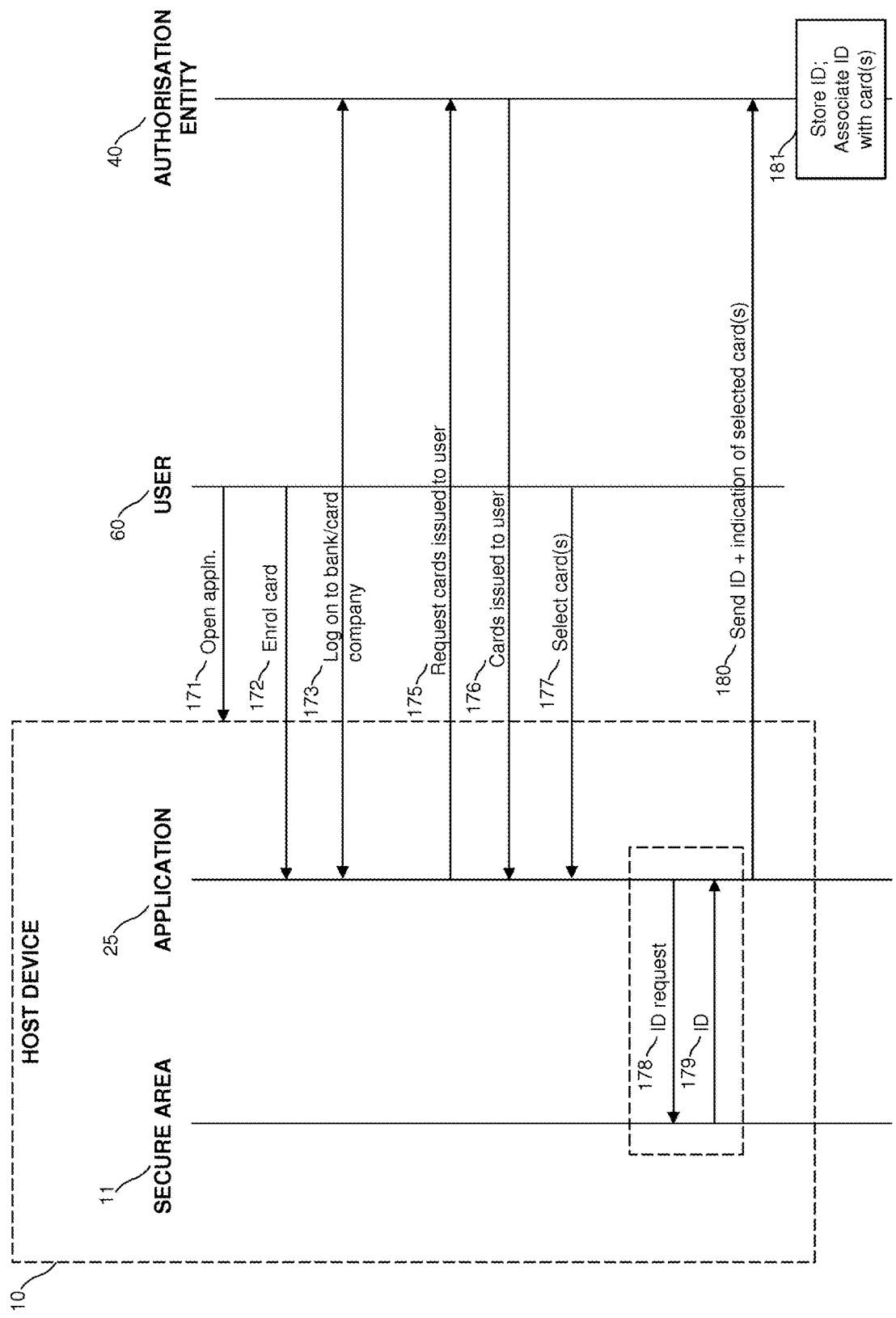

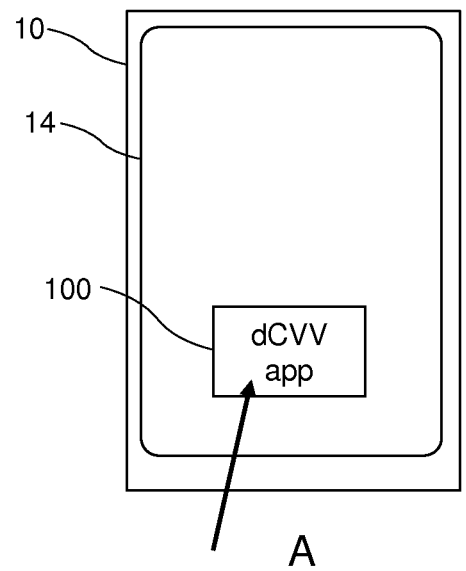
A
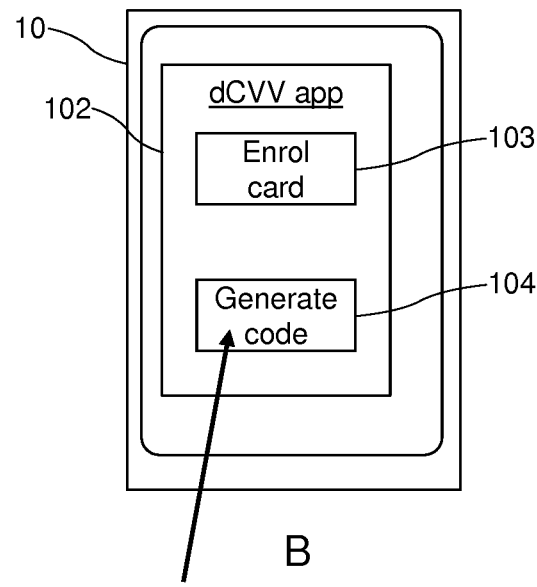
B
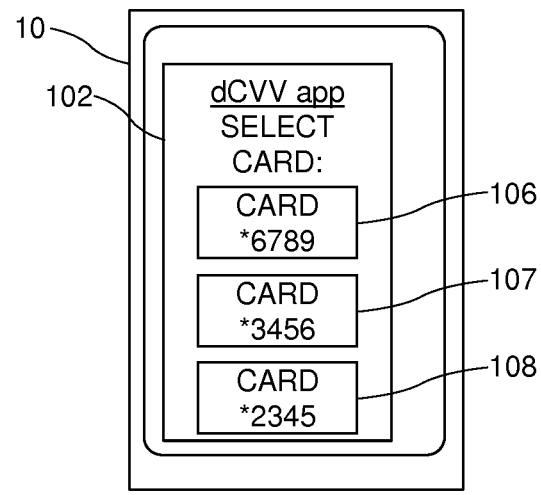
C
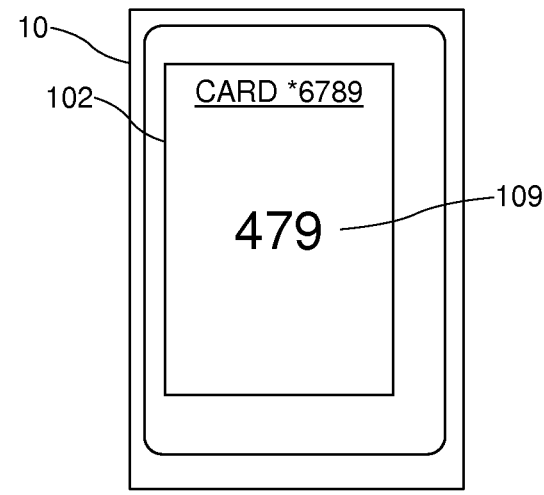
D
Fig. 11

DYNAMIC SECURITY CODE FOR A CARD TRANSACTION

BACKGROUND

Fraudulent use of payment cards, such as credit and debit cards, is an ongoing problem. Card not Present (CNP) transactions pose a particularly high risk. A CNP transaction may be a payment transaction made online, or a payment transaction made by telephone. In a simplest case, a fraudulent party can make a fraudulent transaction by acquiring just the Primary Account Number (PAN) and expiry date of the payment card. Many payment cards now include a Card Verification Value (CVV) to improve security. The CVV is printed on the signature panel of a card, or on the front of the card. However, as the CVV is another static value, it is possible for a fraudulent party to acquire, and use, the CVV in a CNP transaction.

A way of improving security is to dynamically generate the security code. US2014/0279555 A1 describes a card which can dynamically generate a security code. FIG. 1 shows a card of this kind. The card 1 has a magnetic strip 2, a signature panel 3 and a miniature display 4. When a user activates a button 5 on the card, a processor within the card generates a security code and displays the code on the display 4.

While a card with a dynamic code generator and a display can improve security, a disadvantage of this arrangement is an increased cost of the cards.

SUMMARY

An aspect of the invention provides a method of generating a dynamic security code for a card transaction comprising, at an electronic device separate from the card:

receiving a user request to generate a dynamic security code;

sending a time request to a time source external to the electronic device;

receiving a message comprising a time from the time source;

determining an authenticity of the message containing the time;

computing the dynamic security code based on the time received in the message and a key stored at the electronic device; and causing the dynamic security code to be displayed on a display of the electronic device.

Optionally, at least one of: computing the dynamic security code, and causing the dynamic security code to be displayed, are only performed if the message comprising the time is determined to be authentic.

The message comprising the time may comprise a Message Authentication Code, MAC, and determining an authenticity of the message may comprise: computing a Message Authentication Code at the electronic device using a key stored at the electronic device; and comparing the computed Message Authentication Code with the Message Authentication Code in the received message.

The electronic device may store an identifier (ID) and the method may comprise: sending a time request to the time source, the time request including the identifier.

The message comprising the time may comprise a digital signature and determining an authenticity of the message may use a public key of the time source.

The electronic device may be capable of computing a dynamic security code for a plurality of different cards, the electronic device may store a master key, and computing the dynamic security code may comprise deriving a key for a selected one of the cards using the master key.

Computing the dynamic security code may comprise deriving a key for a selected one of the cards using the master key and an additional per-card data element received from an authorisation entity.

The electronic device may store an identifier and the method may comprise an enrolment process of: sending the identifier to an authorisation entity, wherein the identifier can be used to associate the selected card to the key used to compute the security code.

The enrolment process may comprise: receiving partial data about cards issued to a user from an authorisation entity; receiving user input selecting at least one of the cards; and sending the identifier to the authorisation entity, wherein the identifier can be used to associate the selected card to the key used to compute the security code.

The electronic device may be capable of computing a dynamic security code for a plurality of different cards and the method may comprise: causing the electronic device to display an invitation for user input to select one of the plurality of cards; and sending a request to generate a dynamic security code for the selected card.

At least the step of computing the dynamic security code based on the time may be performed by one of: a secure element on the electronic device; or a secure partition of a general purpose processor of the electronic device.

Another aspect provides an electronic device capable of dynamically generating a security code for a card transaction, the electronic device being separate from the card, the electronic device comprising:

at least one processor; storage; a display; a user input device;

wherein the at least one processor is configured to:

receive a request to generate a dynamic security code;

send a time request to a time source external to the electronic device;

receive a message comprising a time from the time source;

determine an authenticity of the message containing the time;

compute the dynamic security code based on the time received in the message and a key stored at the electronic device; and cause the dynamic security code to be displayed on a display of the electronic device.

The at least one processor may be configured to only perform at least one of: computing the dynamic security code; and causing the dynamic security code to be displayed; if the message comprising the time is determined to be authentic.

The electronic device may comprise one of: a secure element on the electronic device which is configured to compute the dynamic security code; a secure partition of a general purpose processor of the electronic device which is configured to compute the dynamic security code.

The electronic device may be one of: a smart phone, a tablet, a personal computer.

The term "dynamic security code" means that the security code is not static, but changes over time.

An advantage of at least one embodiment is that a dynamic security code is generated without the need for a more expensive card with a display (and a battery). Instead, the electronic device is used to perform the functions which would be performed by the card. The electronic device can be one of: a phone, a tablet, a personal computer, or a similar device.

An advantage of at least one embodiment is that a dynamic security code is generated for a particular time. Determining an authenticity of the message containing the time can prevent a fraudulent party acquiring security code values for future times and using the codes at a later time.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described or claimed methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

BRIEF DESCRIPTION OF THE DRAWINGS

Embodiments of the invention will be described, by way of example only, with reference to the accompanying drawings in which:

FIG. 2 shows a system for performing transactions, such as CNP transactions;

FIG. 5 shows preparing a time message at a time server;

FIG. 6 shows authentication of a time message at a host device;

FIG. 10A shows another method of enrolling a card in the system of FIG. 2;

FIG. 11 shows an example sequence of drawings of the user interface on the host device;

DETAILED DESCRIPTION

Figure 1:
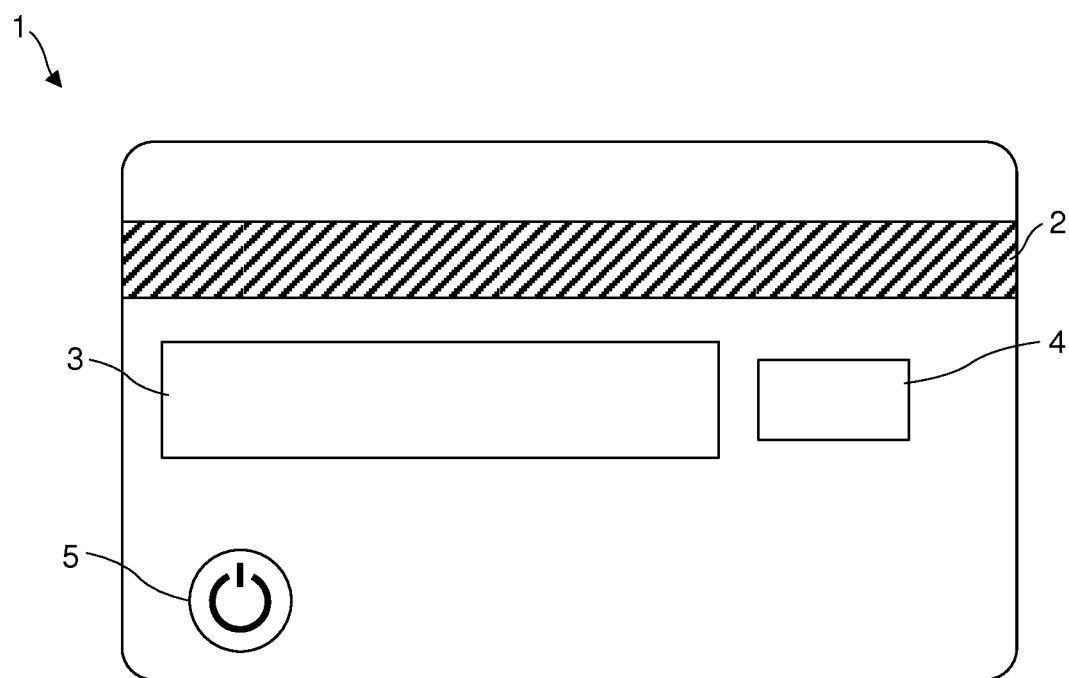
FIG. 1 shows a card which can dynamically generate a security code.

FIG. 2 shows a system for performing transactions. A transaction uses details of a card 35. The card 35 can be a payment card, such as a debit card or a credit card. The system of FIG. 1 can be used for Card Not Present (CNP) transactions. In a CNP transaction the card itself is not presented to a merchant during the transaction. There is no communication between a card reader/payment terminal at a merchant and the card. Instead, only card details printed on the card (e.g. card number, expiry date, security code) are used in the transaction. An example of a CNP transaction is a telephone transaction between a cardholder and a merchant, with a cardholder speaking to a merchant and vocally providing their card details. Another example of a CNP transaction is an online transaction between a cardholder and a merchant, with a cardholder entering their card details into a payment form during an online session with the merchant, or the merchant's payment processor. The entities shown in the system of FIG. 2 are: a host device 10, a card 35, a merchant 45, an authorisation entity 40, a time server 50 and a user 60. The user 60 is a person (e.g. the cardholder) who wishes to make a transaction using the card 35.

The host device 10 is an electronic device which has functionality to dynamically generate a security code for a transaction and a display 14 to display the generated security code. The host device 10 can execute software code 26 to generate the security code. The host device 10 is used to provide similar functionality of dynamically generating a security code as a card of the type shown in FIG. 1. As the host device 10 is providing this code generating functionality, the card 35 can be a conventional card without a display. The host device 10 has a secure area 11 to execute the code generation software 26 and to store the keys 27. The secure area 11 may be a more secure partition of the general purpose processing and storage of the host device 10, or it may be a secure element which is separate to the general purpose processing and storage of the host device 10. The ID 28 is also stored within the secure area 11. Alternatively, the ID can be stored outside the secure area 11. The host device 10 may also store, and execute, an application 25 which communicates with the security code generation functionality 26, outputs information for presentation on the display 14, and receives input from a user input device 13.

The user 60 may use the device 10 to perform a CNP transaction. A user may use device 10 to call, and speak to, a merchant 45, or the user 60 may use browser software on device 10 to perform an online transaction with the merchant 45. This is shown by the communication path 32 between the host device 10 and the merchant 45. In this case, the host device 10 is used to perform the CNP transaction with a merchant 45 and to generate a security code. Optionally, another device 30 is used for the CNP transaction. This is shown by the communication path 31 between the device 30 and the merchant 45. For example, a user may use device 30 to call, and speak to, a merchant 45, or the user 60 may use browser software on device 30 to perform an online transaction with the merchant 45. In this case, the host device 10 is only used to generate a security code and there is no communication path 32 between the host device 10 and the merchant 45. The authorisation entity 40 is an entity responsible for approving transactions, such as a card issuer, bank, payment processor or similar entity. A network 48 connects the host device 10 to the merchant 45, authorisation entity 40 and time server 50. A network connects the merchant 45 to the authorisation entity 40.

The host device 10 can store two main types of key 27:
(i) a first key (dCVV-key_ID) which is used to generate the security code;
(ii) a second key (time-key_ID) which is used to authenticate a message carrying time information received from the time server 50.

The host device 10 stores an identifier (ID) which can be used by another network entity to select an appropriate key when communicating with the device 10. For example, the time server 50 uses the ID to select an appropriate time-key when sending time messages to the device 10. The authorisation entity 40 uses the ID to select a dCVV-key which is the same as the key (dCVV-key_ID) used at the host device 10 to calculate the security code. As will be described more fully below, the first key (dCVV-key_ID) may be used directly, or the first key may be used as a master key to derive a per-card key.

Examples of the host device 10 are a smart phone, a tablet, a personal computer (PC) or any other suitable computing device. The host device 10 is capable of performing other tasks in addition to performing security code generation. For example, the smart phone can be capable of executing applications to perform a range of other tasks such as messaging, email, office applications. The host device 10 may be a portable device, or a fixed device. The host device 10 comprises an input device 13, such as a keyboard, mouse, touchscreen or other device to receive input from the user. The display 14 of the host device 10 is used to provide information to a user, such as prompts for input, the generated code, status of code generation etc. The host device 10 may provide a graphical user interface (GUI).

The authorisation entity 40 stores one or more keys which are used to locally compute a security code. Entity 40 compares the security code that it has computed with a security code received from a device 10, 30 as part of a CNP transaction. If the security codes match, then the transaction is approved subject to other requirements being met. If the security codes do not match, the transaction is rejected. The merchant/authorisation entity 40 stores data which associates the identifier ID with a card. The identifier ID is used to retrieve a key.

The time server 50 stores one or more keys which are used when sending time messages to host device 10.

The host device 10 generates a security code based on a time. The generated security code has a time-limited period of validity. After that period, the security code is no longer valid and a transaction which attempts to use an expired security code will fail. The time server 50 provides a time. The host device 10 uses the time received from the time server 50 to generate the security code. It is advantageous that the time is accurate, to avoid a fraudulent party from computing a security code for a future time. The time server 50 can provide a time to the host device 10 with information allowing the host device 10 to check the authenticity of the message, and therefore the time carried by the message. As described more fully below, the host device 10 can check the authenticity of a message containing the time and may not generate a security code if the message is not authentic.

Figure 3:
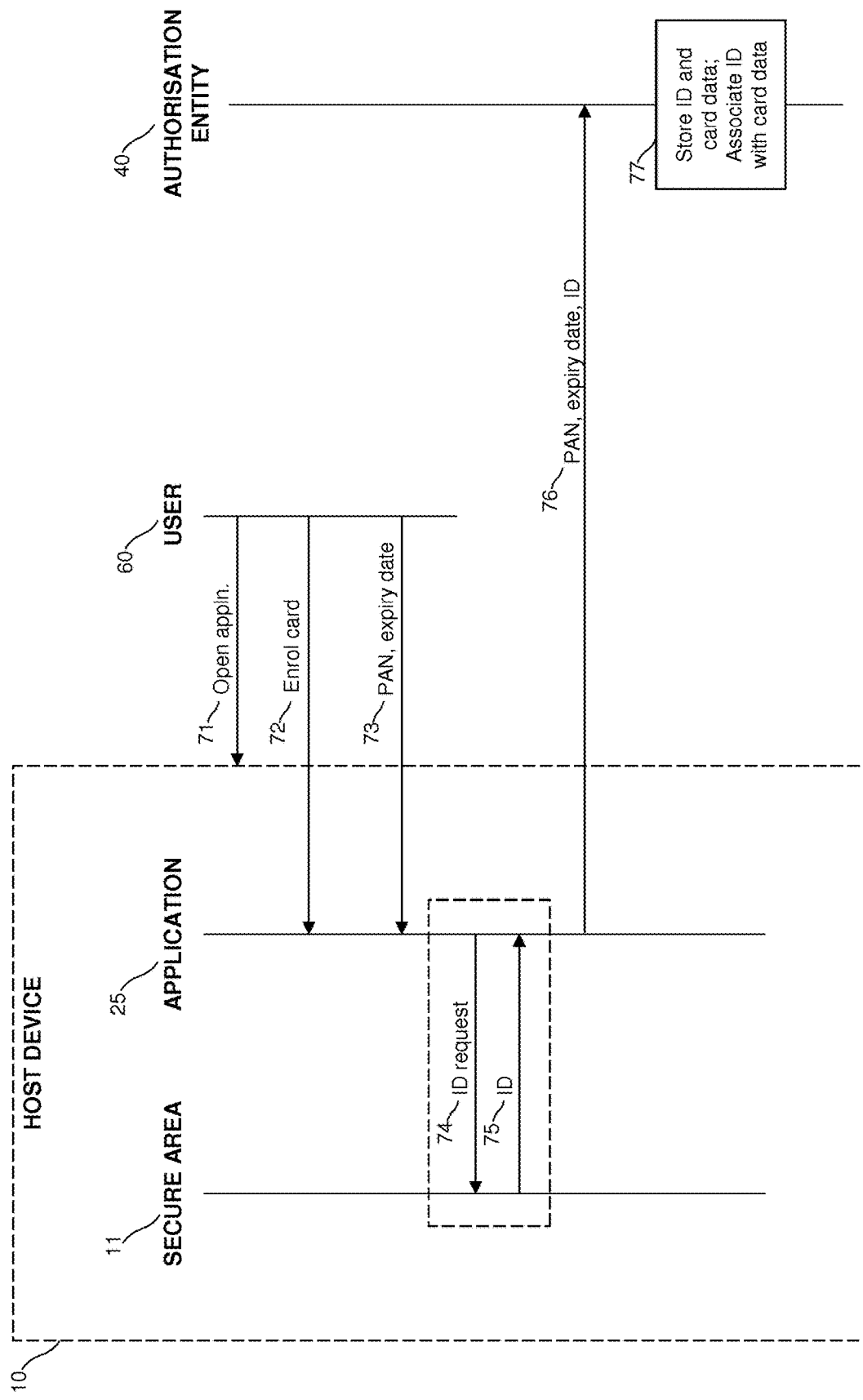
FIG. 3 shows a method of enrolling a card in the system of FIG. 2.
Figure 4:
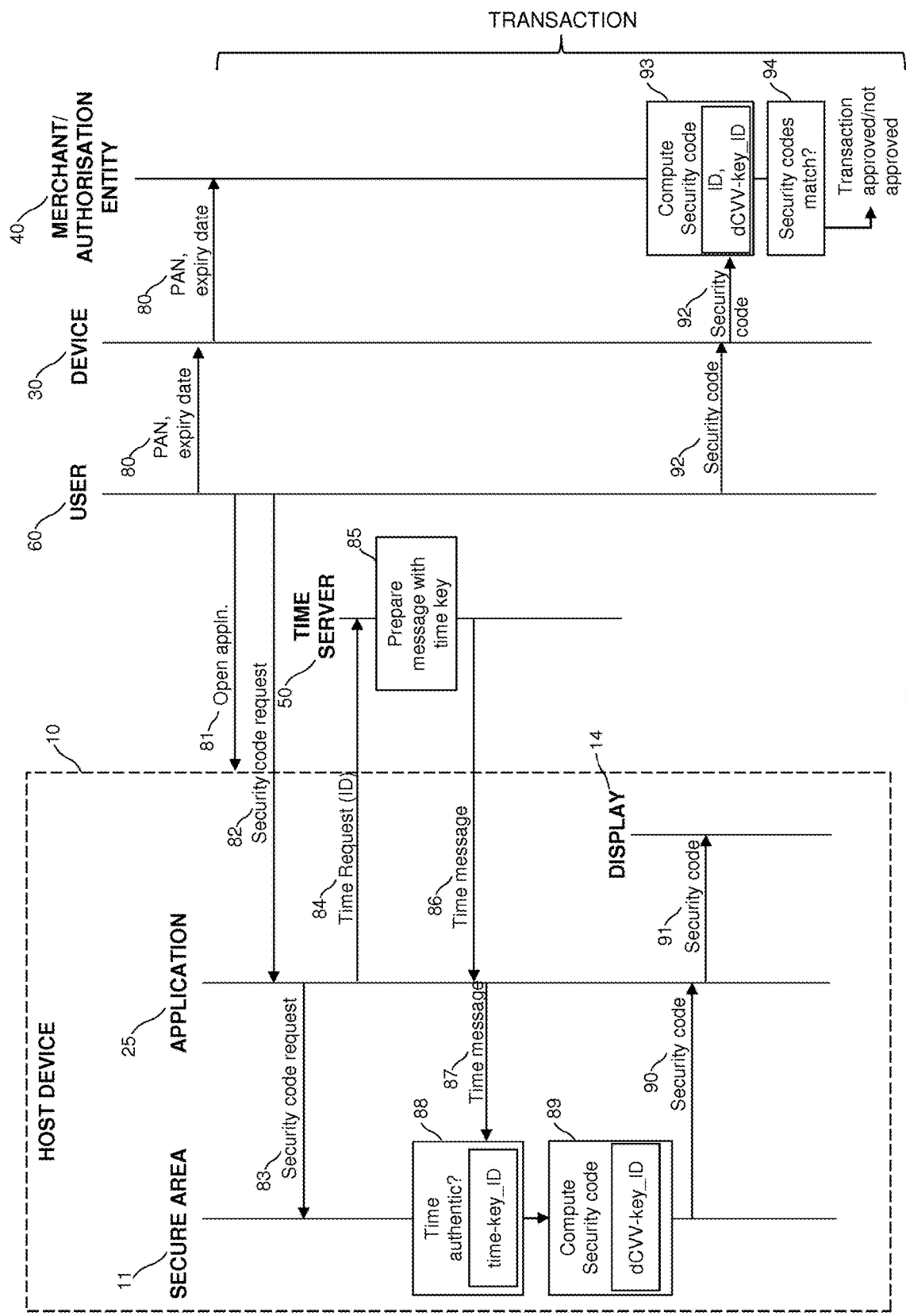
FIG. 4 shows a method of performing a transaction and of dynamically generating a security code in the system of FIG. 2.

There are two main phases (stages) of the method: (i) an enrolment phase, as shown in FIG. 3; and (ii) a use phase, as shown in FIG. 4. The enrolment phase is performed once per card. The effect of the enrolment phase is to enrol a "pairing" of the card with a host device. This allows the authorisation entity 40 to compute an appropriate security code for a CNP transaction. The authorisation entity will know what host device is paired with a card, and can use an appropriate key to generate the security code. The enrolment phase can be repeated if a new or replacement card is issued to the user. The use phase is performed each time a user requires a security code for a CNP transaction.

A first example of the enrolment phase shown in FIG. 3. This example requires the user to enter card data into the host device 10. Other examples of the enrolment phase shown in later Figures avoid the need for the user to enter card data into the host device 10. The example of the enrolment phase shown in FIG. 3 uses the host device 10, the authorisation entity 40 and the user 60. An application 25 on the host device causes the host device to provide a user interface, such as displaying visual information (prompts etc.) on the display 14 of the host device 10 and receiving user input. Firstly, a user opens 71 the application 25 on the host device 10. The user selects 72 an option to enrol a card. Then, the user enters card data for the card to be enrolled. The card data can comprise: a Primary Account Number (PAN) and an expiry date. The user can read the card data from the front of the card. The application 25 obtains an identifier (ID) of the key used at the host device 10. If the application 25 does not already know the ID, it sends an ID request 74 to the secure area 11. The application 25 receives, in reply, an ID from the secure area 11. The ID identifies one or more of the time-key and the dCVV-key installed on the host device 10. The application 25 sends 76 the card data (PAN, expiry date) and the ID to the authorisation entity 40. The authorisation entity 40 stores an association between the card data and the ID. The ID can be used by the authorisation entity 40 to look-up a key appropriate to that device 10 when communicating with the device.

The host device 10 may store the card data (PAN, expiry date) received at 71. Alternatively, the host device 10 may not store the card data (PAN, expiry date) received at 71 any longer than is necessary to forward the data at 76.

An example of the use phase is shown in FIG. 4. The use phase involves the host device 10, the merchant 45, the authorisation entity 40, the time server 50 and the user 60. The use phase also uses the host device 10 to communicate with the merchant 45, or a device 30 to communicate with the merchant 45. The user begins a CNP transaction with a merchant 45. The transaction may be a telephone transaction, or an online transaction with an online merchant or a service provider. The CNP transaction may be transferred to an authorisation entity 40, such as the merchant's payment processor. As part of the CNP transaction, the user is requested to enter card data such as: PAN and expiry date of the card. The user enters this data at 80. The CNP transaction may also request the user to provide other data about the cardholder such as one or more of: cardholder name, cardholder address, post code (ZIP code). The CNP transaction requests the user to enter a security code. The process of obtaining the security code is shown in steps 81-91.

Firstly, a user opens 81 the application 25 on the host device 10. The user requests 82 generation of a security code. The user can interact with an application 25 on the host device 10 to request code generation. For example, the user selects an icon displayed on the user interface on display 14 to generate a security code. The application 25 sends a code request 83 to the secure area 11 of the host device 10. The security code is computed for a particular point in time. The application 25 sends a time request 84 to the time server 50. The time request 84 includes an identifier (ID) of the key on the host device 10. The time server 50 receives the time request 84 and uses the ID to retrieve an appropriate key for the host device 10. The time server 50 prepares a message which includes the current time. The message includes information which allows the receiver to authenticate the message. The authentication can be performed in various ways. One suitable method of authenticating the message is to use symmetric keys at the time server 50 and device 10 and a Message Authentication Code (MAC). The time server 50 computes a MAC which uses the message contents and the device-specific key as inputs. The MAC is added to the message sent to the device 10. The MAC can allow the host device 10 to determine whether another party has tampered with the contents of the message. The time message 86 is sent to the host device 10. The application 25 receives the time message 86 and forwards it to the secure processing environment 11. The time request 84 and the time message 86 can be communicated over any suitable network, such as: a local area network (LAN) interface; a wide area network (WAN) interface; a wireless interface (e.g. WiFi, 2G, 3G, 4G); a wired interface.

At 88 the secure area 11 determines if the time message is authentic. For example, the secure area 11 can compute a MAC using the same inputs as the time server, i.e. the message contents (minus the received MAC) and the device-specific key. If the MAC computed by the host device 10 is the same as the MAC in the received message, the message contents (i.e. the time) is determined to be authentic. At 89, the secure area 11 proceeds to compute the security code. The generated security code is sent 90 to the application 25 and forwarded to the user interface, and displayed on display 14. The method may only proceed to compute the dynamic security code at 89 if the message containing the time is determined to be authentic. If the message containing the time is determined to not be authentic, the method does not compute the dynamic security code. The method may return an error message to the application 25, for display on the display 14.

Returning to the CNP transaction, the user can now see the security code on the display 14 of device 10. The user provides the displayed code 92 to the merchant 45 or authorisation entity 40 via device 30. The authorisation entity 40 independently computes the security code. The authorisation entity 40 uses the card data (e.g. the PAN, expiry date) to retrieve the ID of the host device 10. The merchant/authorisation entity 40 then uses the ID to retrieve a device-specific key. The authorisation entity 40 then computes the security code using the device-specific key. The security code 92 received from the user is compared 94 with the security code computed at 93. If the security codes match the transaction is approved. If the security codes do not match the transaction is not approved. Other criteria may be used to reach a decision on whether to approve the transaction, such as credit limit, spending patterns, transaction location etc. FIG. 4 shows a combined merchant/authorisation entity. It will be understood that a CNP transaction will typically involve some initial communication between device 10/30 and the merchant 45. The authorisation entity 40 is involved when authorisation is needed. The merchant 45 may contact the authorisation entity 40 (e.g. if the transaction is conducted by a voice call) or the merchant may transfer the transaction to the authorisation entity 40 (e.g. during an online transaction, before or after a user has entered card details).

It will be understood that the steps of the method may be carried out in any suitable order, or simultaneously where appropriate. For example, the security code request 83 and the time message 87 may be sent to the secure area 11 together, or the security code request 83 may be sent to the secure area 11 later than shown in FIG. 4.

Time Message Authentication

FIGS. 5 and 6 show an example of authentication of the time message using symmetric keys at the time server 50 and host device 10. FIG. 5 shows functionality at the time server 50. A MAC-computing function 113 receives the message contents to be sent 111 (including time) and the device-specific key (time-key_ID) 112 as inputs. The MAC is computed by function 113 and output 114. The computed MAC 114 is added to the message 115 sent to the device 10.

FIG. 6 shows functionality at the host device 10. A MAC-computing function 123, similar to the one 113 at the time server 50, receives the message from the time server 50 and the device-specific key 112 as inputs. The MAC is computed by function 123 and output 124. The device then determines if the MAC computed by the device is equal to the MAC computed by the time server, i.e. does MAC (device)=MAC (time server). If the MAC computed by the host device 10 is the same as the cryptogram in the received message, the message contents (i.e. the time) is determined to be authentic. The time server and device can use a pair of symmetric keys 112, 122 having the same value. The MAC can be computed over all, or a part, of the message. The method may use a hashing function to compute a hash, and the MAC-computing function 113 may be computed on the hash. An example of a suitable hash function is Hash-based Message Authentication Code (HMAC). Examples of suitable block cipher based functions are cipher block chaining message authentication code (CBC-MAC) and Cipher-based Message Authentication Code (CMAC). An example of an authenticated time service is the service provided by The National Institute of Standards and Technology (NIST).

Another way of authenticating the time messages is by using an asymmetric key pair (private key, public key) and a digital signature. The time server 50 has a private key and a public key. The time server performs a hash of the message and computes a digital signature using the time server's private key. The host device 10 decodes the digital signature using a public key of the time server 50 and checks if the decoded signature matches a hash of the message data. If there is a match, the message is determined to be authentic. This method requires the host device 10 to store the time server's public key. There are several possible ways of providing the time server's public key to the host device 10:

- the time server's public key is stored in advance, e.g. at personalisation of the secure area 11 or when the software is first created.
- the time server's public key is received at a later time, during an "activation" phase. The host device 10 already stores a public key of a certification authority (CA). The time server's public key is received as part of a certificate. The host device 10 checks the validity of the certificate containing the time server's public key, using the public key of the CA, before storing the time server's public key.
- the time server's public key is never stored. The time server's public key is received (e.g. as a certificate) with the time message. The certificate is verified, as explained above. This allows more flexibility in the choice of the time server 50.

Figure 7:
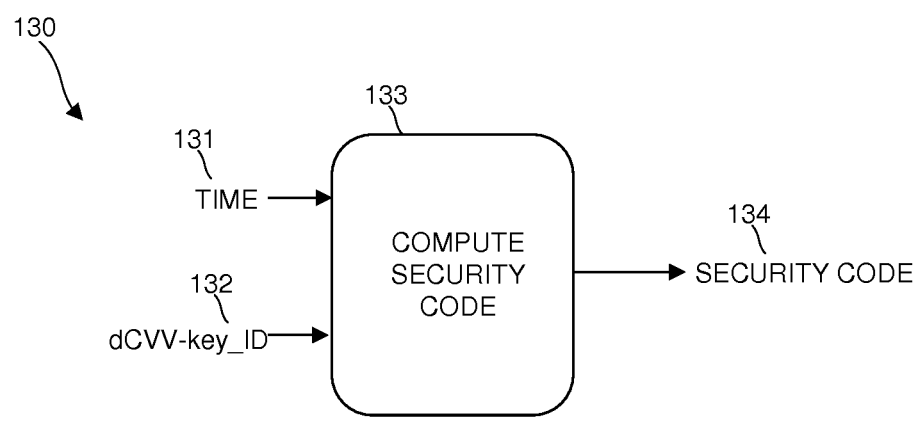
FIG. 7 shows computation of a security code at a host device.

FIG. 7 schematically shows functionality at the device 10 to compute the security code. A function 133 receives the time 131 (as received from the time server 50) and the device-specific key (dCVV-key_ID) 132 as inputs. The function 113 computes the security code and outputs the security code 134.

Key Storage and Computation

Figure 8A:
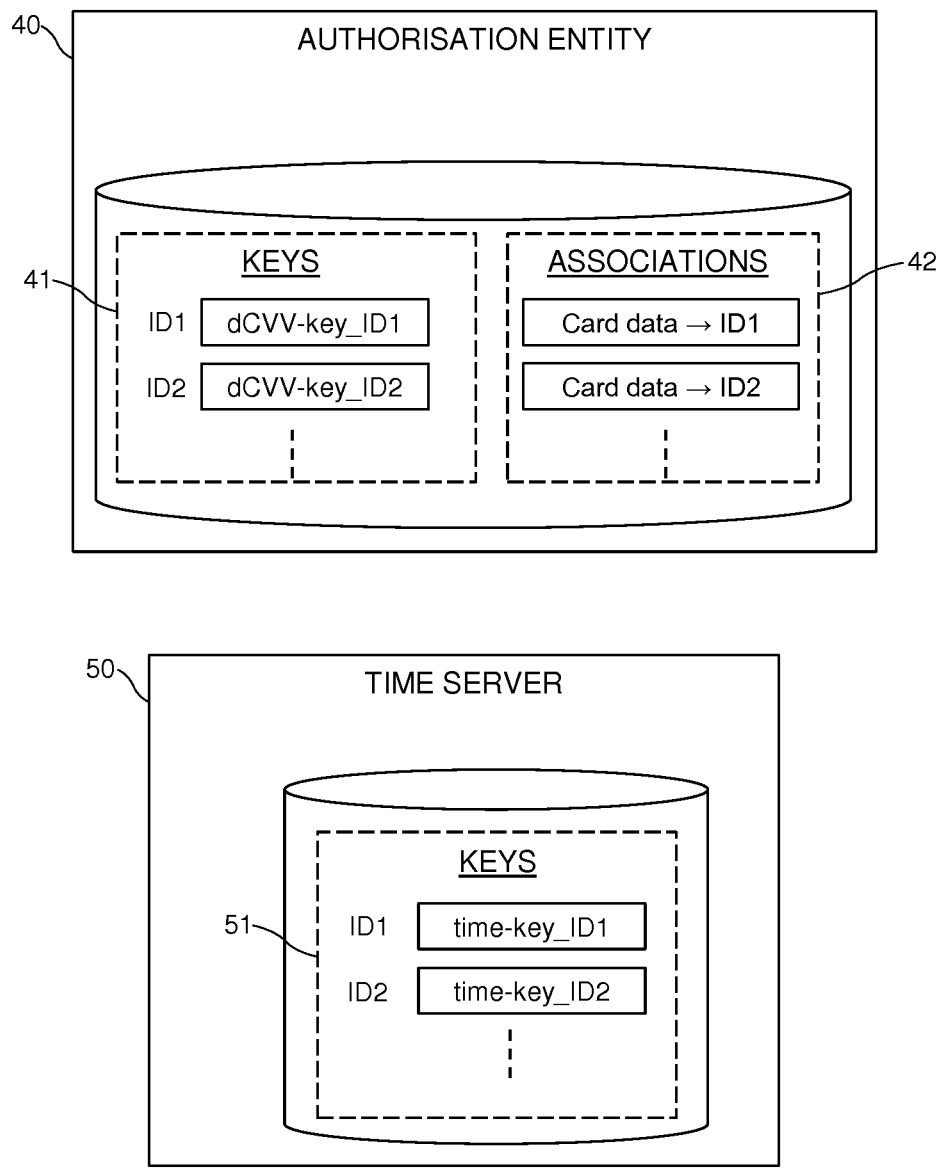
FIG. 8A shows an example of data stored at an authorisation entity and a time server.
Figure 8B:
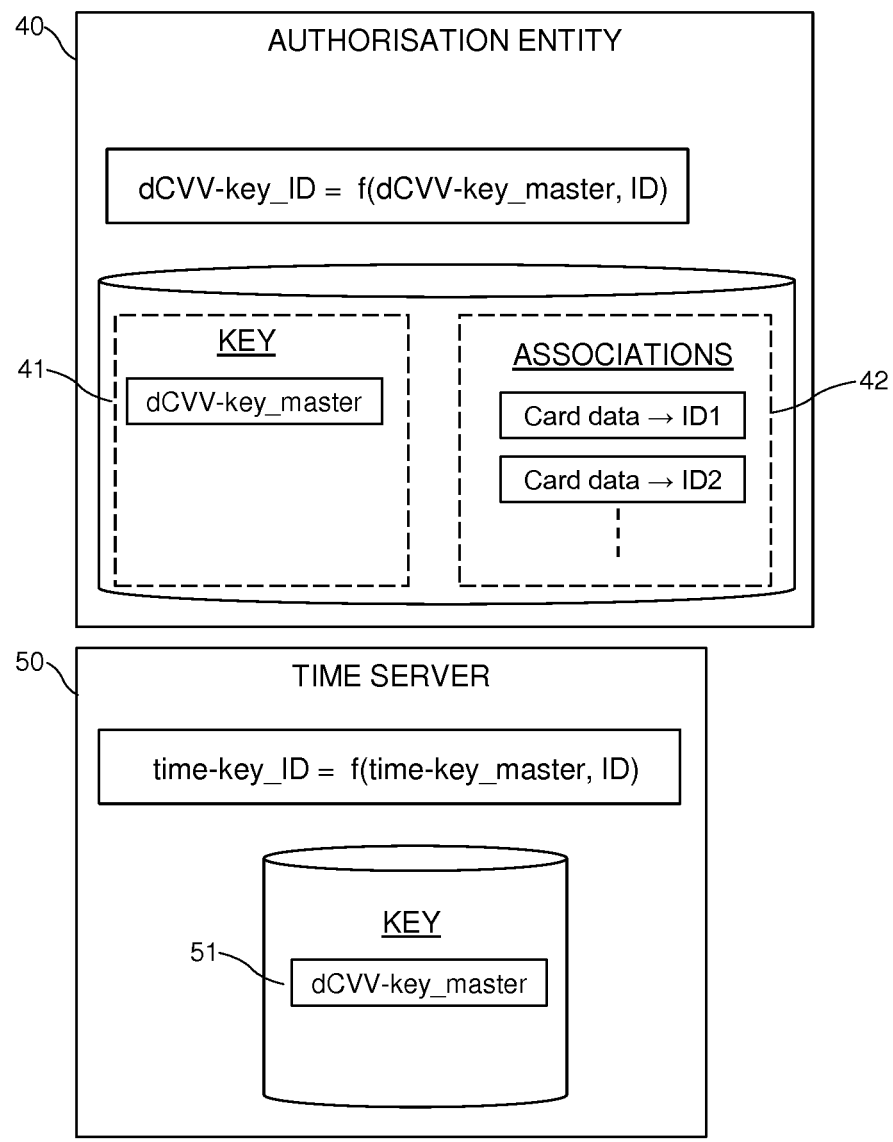
FIG. 8B shows an example of functionality and data stored at an authorisation entity and a time server.

FIGS. 8A and 8B show some examples of the authorisation entity 40 and time server 50. In FIG. 8A the authorisation entity 40 stores keys 41 for the devices it is required to communicate with. The authorisation entity 40 stores associations 42 between card data and identifiers received from host devices 10. As shown in FIG. 3, during an enrolment phase the authorisation entity 40 receives an identifier ID from a device and card data (e.g. PAN and expiry date). The card data is associated with the identifier ID. The identifier ID is used as an index to look-up a respective key 41. For example, ID1 corresponds to dCVV-key_ID1, ID2 corresponds to dCVV-key_ID2 and so on. The time server stores keys 51 for the devices it is required to communicate with. The identifier ID received from a host device (e.g. 84, FIG. 4) is used as an index to look-up a respective key 51. For example, ID1 corresponds to time-key_ID1, ID2 corresponds to time-key_ID2 and so on.

FIG. 8B shows another example of the authorisation entity 40 and time server 50. In FIG. 8B the authorisation entity 40 stores a master key (dCVV-key_master) and derives a per-device dCVV-key (dCVV-key_ID):

$$dCVV\text{-}key\_ID = f(dCVV\text{-}key\_master, ID)$$

where f(dCVV-key_master, ID) is a cryptographic function with dCVV-key_master and ID as inputs. As in FIG. 8A, the authorisation entity 40 stores associations 42 between card data and identifiers received from host devices 10. The identifier ID is used to derive a respective key. For example, dCVV-key_ID1 is derived by a function with dCVV-key_master and ID1 as inputs, dCVV-key_ID2 is derived by a function with dCVV-key_master and ID2 as inputs and so on. In a similar manner, the time server stores a master key (time-key_master) and derives a per-device time-key (time-key_ID):

$$time\text{-}key\_ID = f(time\text{-}key\_master, ID)$$

where f(time-key_master, ID) is a cryptographic function with time-key_master and ID as inputs. The identifier ID is used to derive a respective key. For example, time-key_ID1 is derived by a function with time-key_master and ID1 as inputs, time-key_ID2 is derived by a function with time-key_master and ID2 as inputs and so on.

FIGS. 8A and 8B show examples of the time server 50 where symmetric keys are used, and the time server 50 retrieves a key for a particular host device 10. If time messages are authenticated using an asymmetric key pair (private key, public key) then the time server 50 stores a private key, and optionally stores a public key which is sent to the host device 10.

Figure 8C:
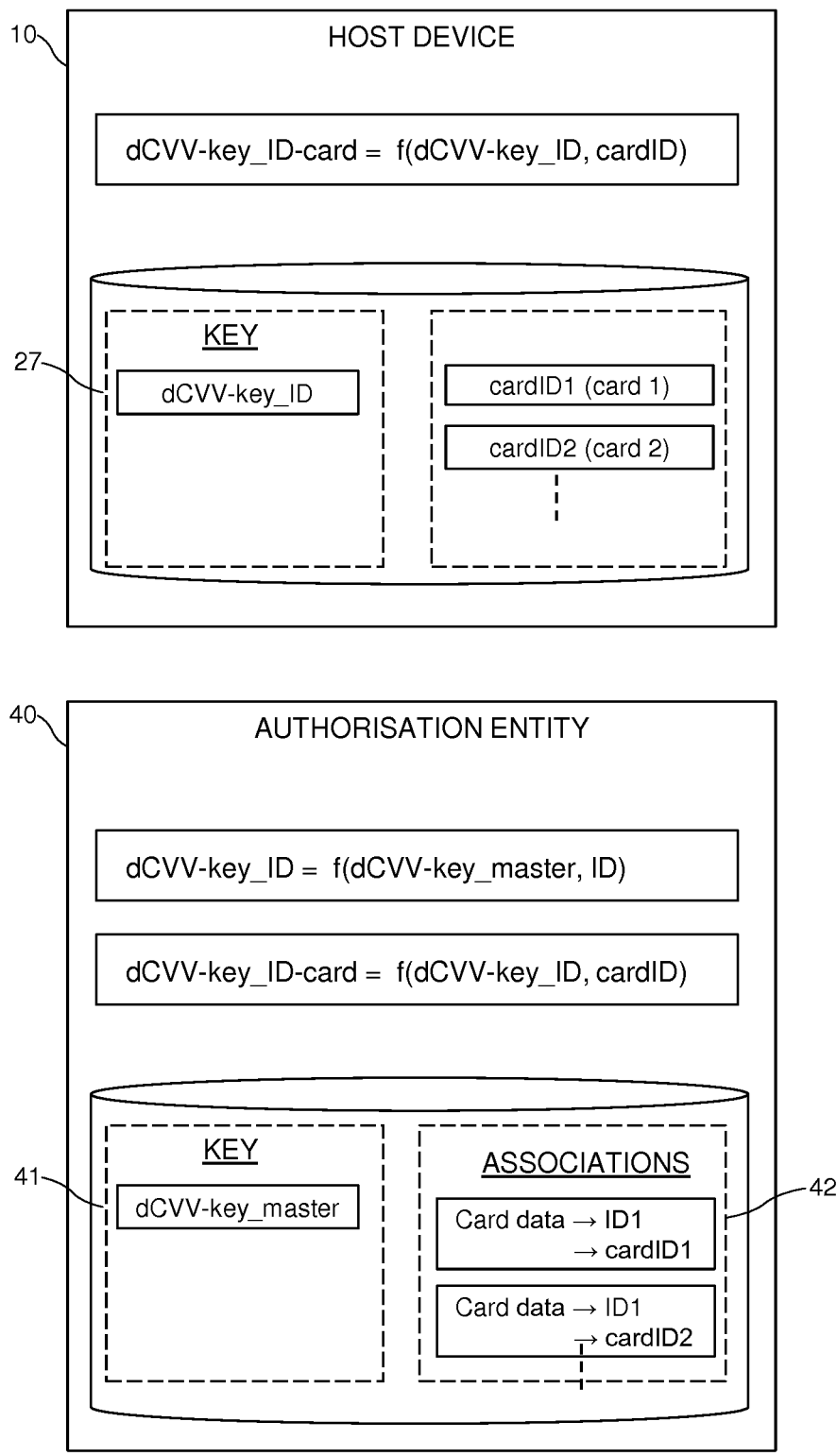
FIG. 8C shows an example of functionality and data stored at a host device and an authorisation entity.

FIG. 8C shows another example of the host device 10 and the authorisation entity 40. This example can be used where the host device 10 is used to generate security codes for a plurality of different cards. In this example the host device 10 uses the key dCVV-key_ID as a master key. The host device 10 derives a dCVV-key per card using the master key and some per-card data element, here called "cardID". The per-card data element only needs to be sufficient to uniquely identify the card from other cards on that device. For example, a first enrolled card could be represented by cardID1 having a value "1", a second enrolled card could be represented by cardID2 having a value "2", or some other scheme could be used. The per-card data element may be derived from card data stored at the authorisation entity 40, such as PAN and expiry date. Advantageously, the per-card data element does not contain sensitive information. The authorisation entity 40 stores associations 42 between card data and identifiers (ID) received from host devices 10. In addition, the authorisation entity 40 stores associations 42 to the cardID allocated to that card. In the illustrated example, the authorisation entity stores an association between card data and ID1, and also to cardID1. The per-card dCVV-key is derived by a two-step process:

$$Step 1: dCVV\text{-}key\_ID = f(dCVV\text{-}key\_master, ID)$$

$$Step 2: dCVV\text{-}key\_ID\text{-}card = f(dCVV\text{-}key\_ID, cardID)$$

Step 1 is the same as in FIG. 8B. Step 2 is an additional step. The authorisation entity 40 can send the cardID to the host device 10 during the enrolment phase. In any of the above examples, the authorisation entity 40 and the time server 50 can store the master-key in an HSM (Hardware Security Module).

Multiple Enrolled Cards

Figure 9:
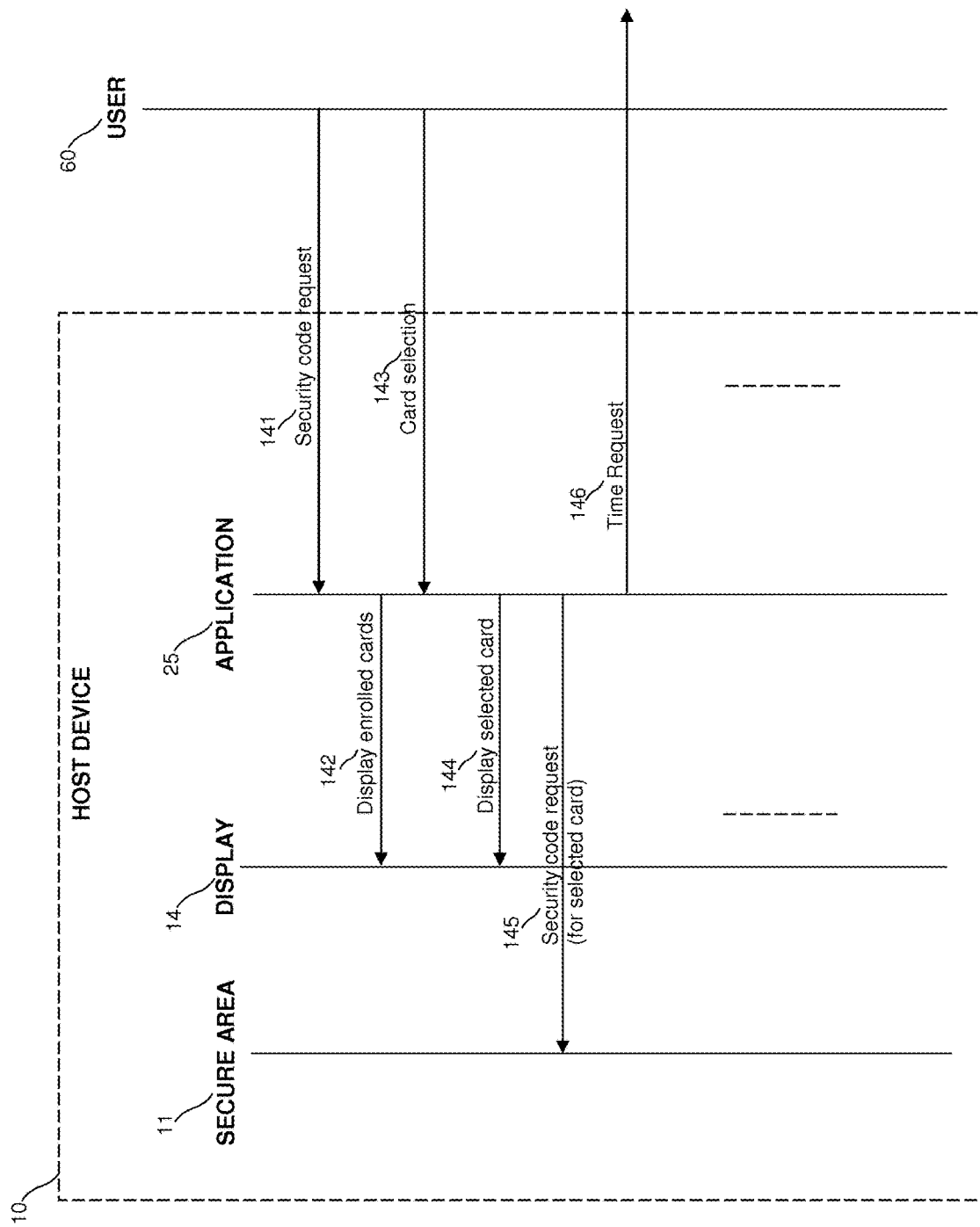
FIG. 9 shows selection of a card at the host device.

The application 25 and code generating function 26 at the host device 10 may support a plurality of cards. For example, the user may use the host device to generate security codes for a debit card and for several credit cards. Each card is enrolled in the manner shown in FIG. 3. The code generating function 26 is capable of generating a security code for a card selected from the plurality of cards. The code generating function 26 uses a key appropriate to each of the cards. An initial part of the use phase is modified as shown in FIG. 9. A user opens the application 25. At 141, the user requests generation of a security code. The application 25 causes 142 the user interface to display information about the plurality of enrolled cards. At 143, a user selects one of the displayed cards. The application 25 causes 144 the user interface to display the selected card. The application 25 sends a security code request 145 to the secure area 11 for the selected card. The application 25 sends a time request 146 to the time server at 142. The method continues in a similar manner as shown in FIG. 4.

Enrolment Without Storing Card Data at Host Device

Figure 10B:
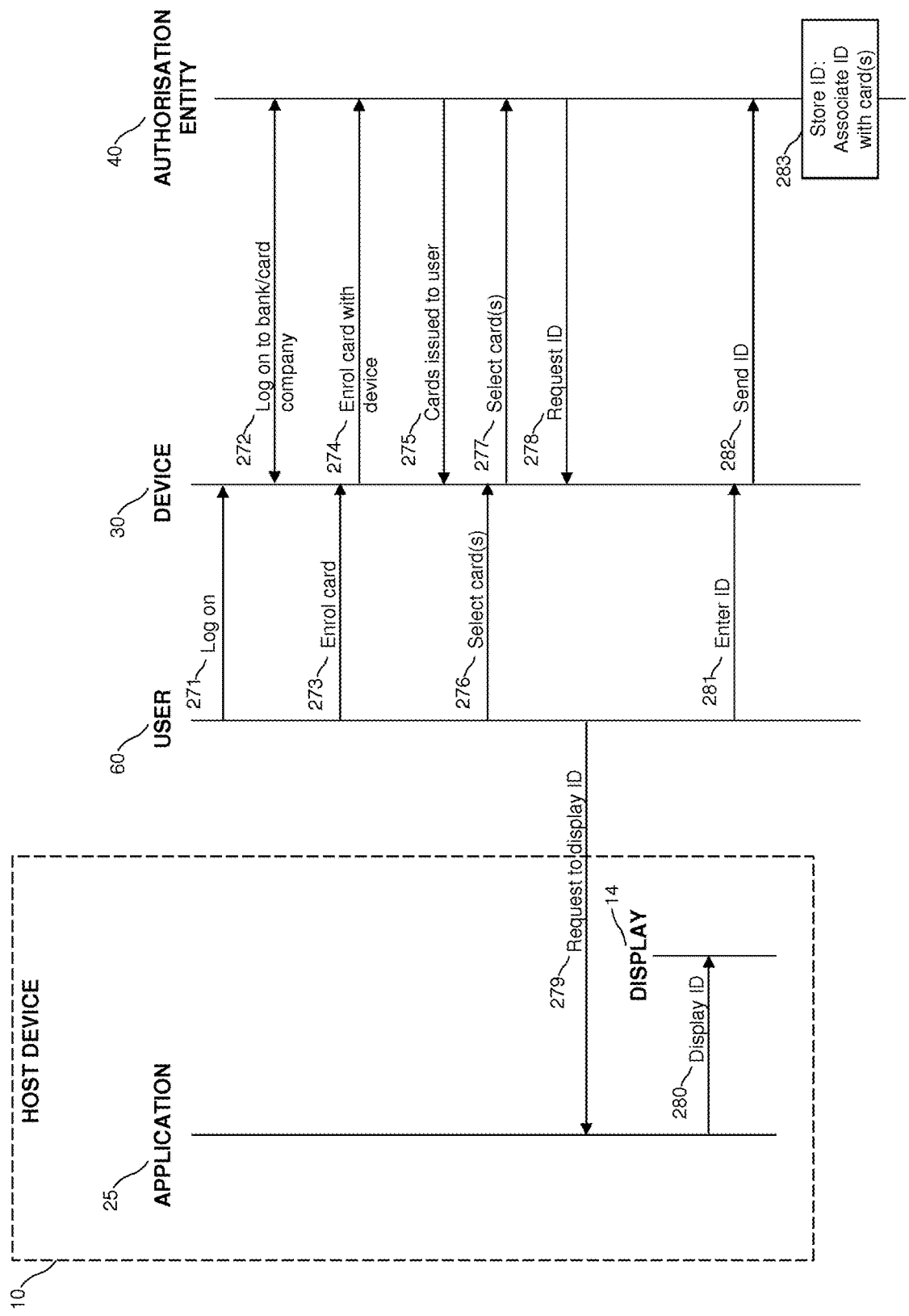
FIG. 10B shows another method of enrolling a card in the system of FIG. 2.

The card enrolment method shown in FIG. 3 requires entry of card data on the host device 10. FIGS. 10A and 10B show two examples of card enrolment which do not require entry of card data. FIG. 10A uses the host device 10 only. FIG. 10B uses the host device 10 and another device 30. The authorisation entity 40 (e.g. bank or card issuer) already stores details of cards which have been issued to a user. The methods shown in FIGS. 10A and 10B make use of this previously stored data.

Referring to FIG. 10A, a user opens 171 the application 25 on the host device 10. The user selects 172 an option to enrol a card. The application 25 communicates with the authorisation entity 40. The log on may require the user to enter log on credentials. The application 25 requests the authorisation entity to send details of cards issued to the user. The log on process identifies the user. The card data is sent 176 by the authorisation entity 40. Only partial card data is sent. The term "partial card data" means only part of the card data, such as only the last four digits of each issued card(s). The partial card data is enough to allow a user to identify the card, but insufficient for a fraudulent party to acquire enough information to commit fraud. The user selects, at 177, which card or cards they wish to enrol with this host device 10. The application may obtain the ID if it does not already have this information. The application 25 to the authorisation entity 40 the ID of the device and an indication of the selected card(s) to be enrolled. The authorisation entity 40 stores 181 the ID and an association of the ID to card data, as described in FIGS. 8A-8C. In this example no card data is entered by a user or stored at the host device 10. During the method of FIG. 10A the authorisation entity 40 may send a per-card data element to the host device 10, for use in computing a per-card key from a master key.

In FIG. 10B a user uses another device, separate from the host device 10, to enrol a card with the authorisation entity 40. The user logs onto the website of their card issuer (e.g. bank or credit card company). The log on will typically require the user to enter log on credentials which identify the user. At 273, 274 the user selects an option to enrol a card with a device. The card data is sent 275 by the authorisation entity 40. Only partial card data is sent. The user selects at 276, 277 which card or cards they wish to enrol with this host device 10. The authorisation entity 40 requests the ID of the device. The user requests the host device 10 to display the ID, such as by opening the application 25 and selecting an option to "Display ID". The ID is displayed at 280. The user enters the ID at 281, and the device 10 sends 282 the ID to the authorisation entity 40. The authorisation entity 40 stores 283 the ID and an association of the ID to card data, as described in FIGS. 8A-8C. In this example no card data is entered by a user or stored at the host device 10.

Not storing card details has several advantages. One advantage is that a fraudulent party cannot obtain all of the card details required to make a CNP transaction from the host device 10. Therefore, even if a hacker circumvented security on the host device 10, they would not obtain the card details. Another advantage is that it reduces storage requirements on the host device.

User Interface

FIG. 11 shows an example sequence of drawings A-D of the user interface on the host device 10. In drawing A, the user interface displays an icon 100 for the security code generating application (dCVV). When a user selects icon 100, the security code generating application begins, and the user interface changes to the one shown in drawing B. A window 102 displays two high-level options for the application: enrol a card 103; generate a security code 104. In this example, it is assumed the user selects the option to generate a security code. The user interface changes to the one shown in drawing C. The window 102 displays an icon 106-108 for each of the enrolled cards. In this example, it is assumed the user selects the option to generate a security code for the card with a PAN ending *6789. The host device 10 performs the method shown in FIG. 4 (83-90) and the user interface changes to the one shown in drawing D. The window 102 displays the security code 109. In this example, the security code is the three digit number "479". The user interface may display the security code for a time-limited period, e.g. 30 seconds.

In other examples, the sequence of user interface actions may be extended or truncated. For example, if only one card is enrolled with the application, the user interface may proceed directly from drawing B (Generate code) to drawing D, without the option to select a card.

Host Device

Figure 12:
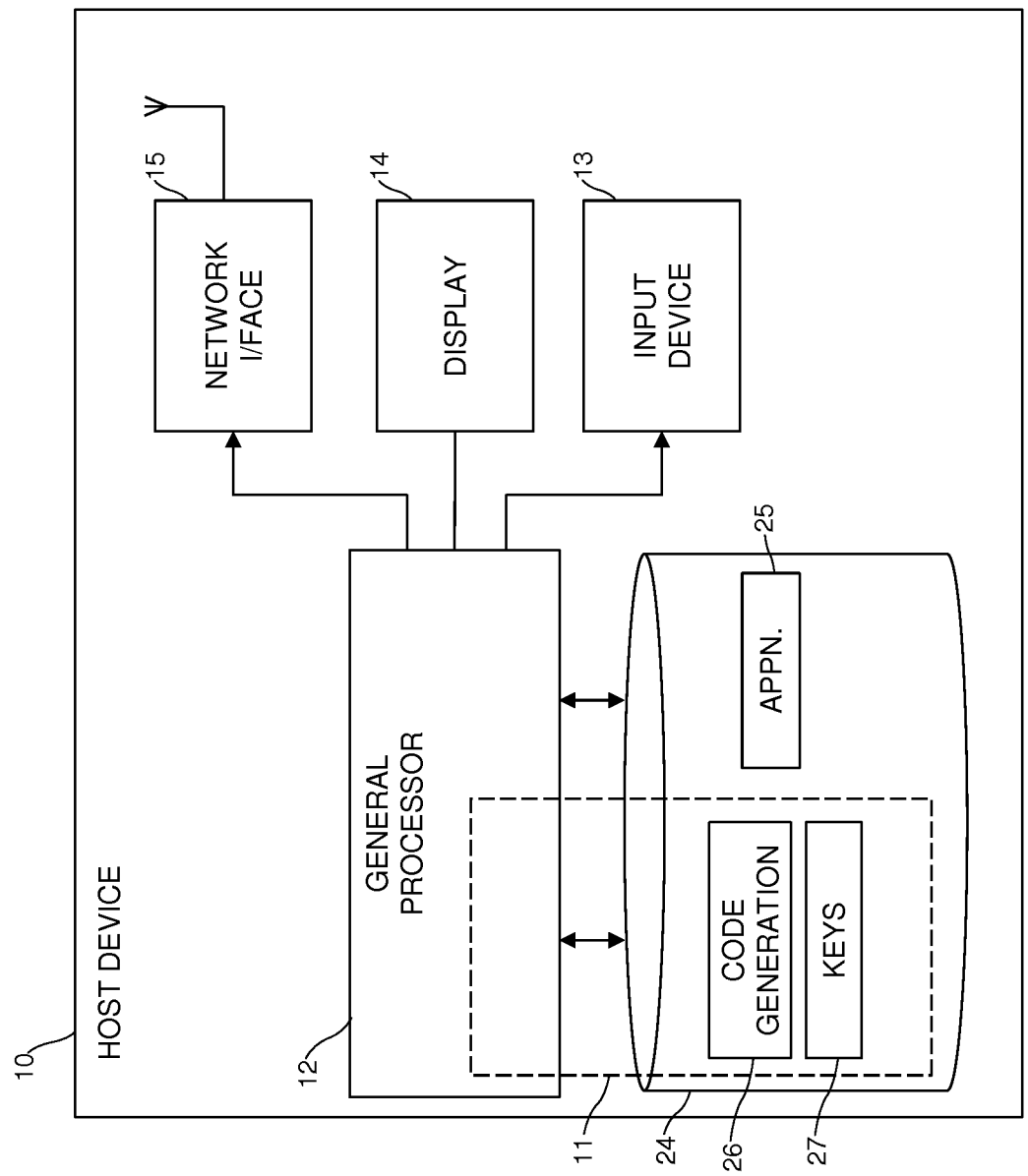
FIG. 12 schematically shows a possible implementation of a host device.
Figure 13:
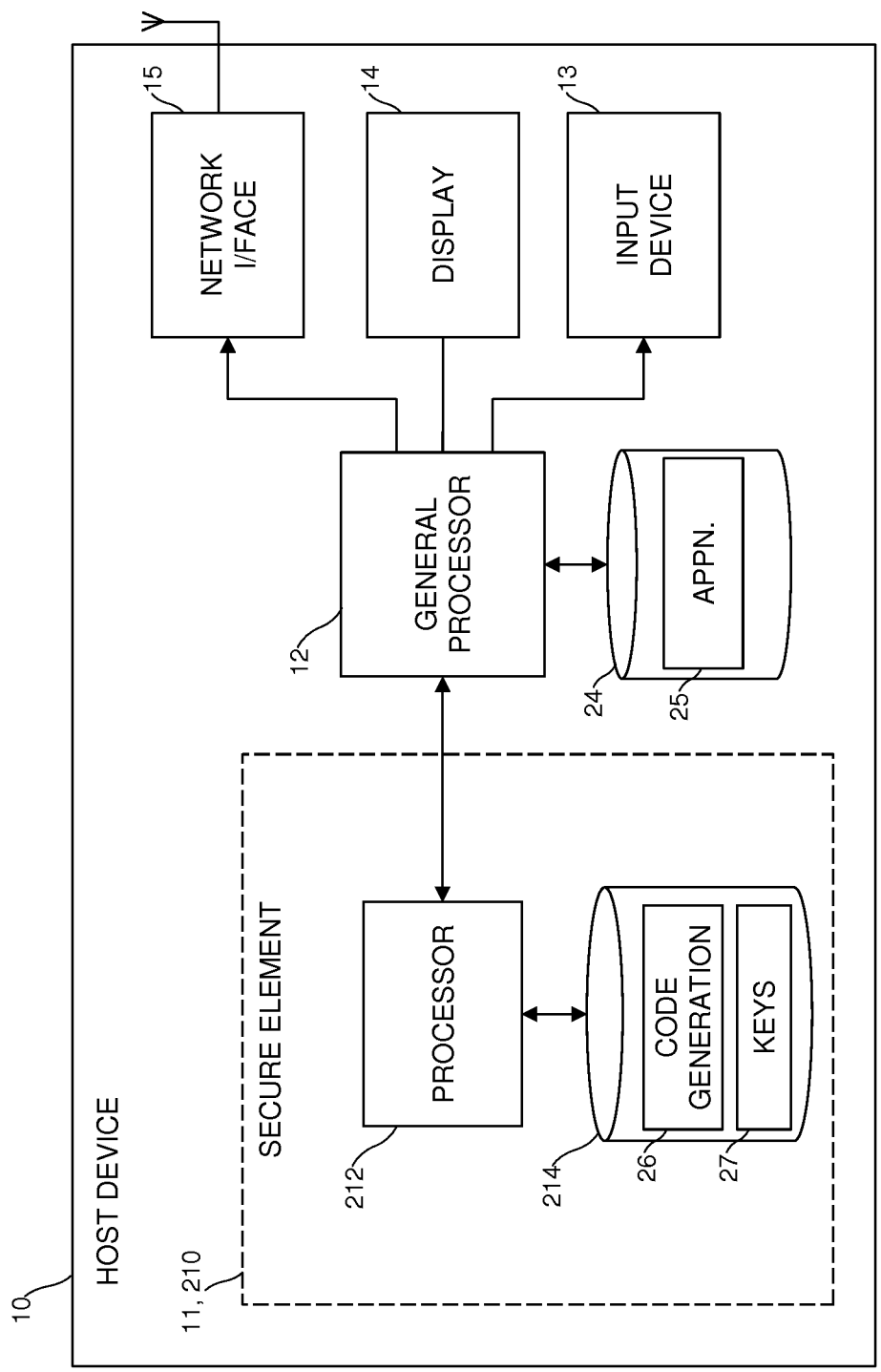
FIG. 13 schematically shows a possible implementation of a host device with a secure element.

FIGS. 12 and 13 schematically show two alternative implementations of the host device 10. In both implementations there is a secure area 11. In FIG. 12 code generation functionality is performed by a general-purpose processor 12 of the device. The general-purpose processor 12 may be called an Application Processor (AP). Code generation software 26 and keys 27 are stored in a secure partition of the general storage 24, or in a separate store. In FIG. 13, code generation functionality is performed by a secure element 210 on the host device 10. A secure element (SE) 210 may comprise a processor 212 and a memory 214. The SE provides a secure storage and execution environment which is separate from the general-purpose processor 12. Access to the SE is restricted. For example, access to the SE may be restricted to messages of a certain type, or with certain properties. In FIG. 13, the memory 214 within the SE stores the software code 26 to generate the security code and any keys used by the software code 26. The SE can also store a key used to authenticate the time message.

In both FIGS. 12 and 13, the host device 10 can comprise a general-purpose processor 12, such as an application processor (AP). Processor 12 may comprise one or more processors which may be microprocessors, microcontrollers or any other suitable type of processors for executing instructions. The processor 12 is connected to other components of the device via one or more buses. Processor-executable instructions may be provided using any computer-readable media, such as storage 24. The processor-executable instructions can comprise instructions for implementing the application 25 described above. The storage 24 may be of any suitable type such as non-volatile memory (e.g. Flash, Electrically Erasable Programmable Read Only Memory (EEPROM)), read-only memory (ROM), random access memory (RAM), a storage device of any type such as a magnetic or optical storage device. The device 10 comprises one or more network interfaces 15. The network interface may be one or more of: a local area network (LAN) interface; a wide area network (WAN) interface; a wireless interface (e.g. WiFi, 2G, 3G, 4G); a wired interface; or any other suitable network interface. The network interface (15) can be used to send the time request (84, FIG. 4) and receive the time message (86, FIG. 4). The device 10 comprises an input device 13 such as one or more buttons, a keyboard, a pointing device, a touch screen. The device 10 comprises a display 14.

In FIG. 13, the secure element (SE) 210 may be an embedded SE. An embedded SE may be a separate hardware element on a circuit board of the host device. Other possible forms of secure element are: a SE as a SIM card—Universal Integrated Circuit Card (UICC); a SE as an embedded SIM—eUICC; a SE as an integrated SIM—iUICC; a SE in a separate card, such as a Secure Digital (SD) card.

In FIG. 12, it is possible to partition the processing environment of the general processor 12 to provide a secure partition. The secure partition can be used to execute the security code generating software code 26. The partitioning can be done in different ways, such as: a specific hardware IP block integrated to the System on Chip (SoC); a trusted execution environment (TEE), implemented by an hypervisor or a TEE as defined by Global Platform.

The examples described above use a single identifier ID at the mobile device to identify a time authenticating key (time-key_ID) and a code generating key (dCVV-key_ID). In other examples, it is possible to use an identifier per key, i.e. a first ID, ID1, to identify a time authenticating key (time-key_ID1) and a second identifier, ID2, to identify a code generating key (dCVV-key_ID).

In any of the examples described above one or more of the keys may be installed during a personalisation stage of the secure area 11 (e.g. during manufacture of the electronic device 10), or a personalisation stage of software distributed to the electronic device. Alternatively, one or more of the keys may be installed at a later stage during a communication exchange between the electronic device 10 and a server.

The steps of the methods described herein may be carried out in any suitable order, or simultaneously where appropriate.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of securing a card transaction performed at a user electronic device separate from a card used for the card transaction, the card associated with a user and having details comprising card information, the user electronic device storing an identifier the card transaction using the card details of the card, the method comprising:
   a preliminary enrolment process that includes, at the user electronic device:
      receiving, from an authorization entity, a set of partial data respectively associated with a set of cards issued to a user, each partial data allowing the user to identify a card of said cards respectively associated with a corresponding one of said partial data,
      receiving user input selecting one card among the set of cards, the selected card being selected based on the received partial data respectively associated with the selected card, and
      sending the identifier to the authorization entity,
   the identifier being usable to associate the selected card to a key for dynamically computing a dynamic security code;
   at the user electronic device, receiving, via a user input device of the user electronic device, a user request to generate the dynamic security code;
   at the user electronic device, upon receiving the user request, sending a time request to a time source external to the user electronic device;
   at the user electronic device, receiving, in response to the time request, a message comprising a time from the time source;
   at the user electronic device, determining an authenticity of the message containing the time;
   at the user electronic device, computing the dynamic security code as a function of the time received in the message and the key stored at the user electronic device;
   at the user electronic device, causing the dynamic security code to be displayed on a display of the user electronic device;
   at the authorization entity, receiving the card details of the card, including the dynamic security code computed by the user electronic device and other card data relative to the card;
   at the authorization entity and based on the other card data relative to the card, determining the identifier;
   at the authorization entity, determining a specific key based on the determined identifier;
   at the authorization entity, computing a verification code as a function of the specific key; and
   at the authorization entity, authorizing the card transaction only when the computed verification code and the received dynamic security code match.

2. The method according to claim 1, wherein at least one of:
   computing the dynamic security code, and
   causing the dynamic security code to be displayed
are only performed if the message comprising the time is determined to be authentic.

3. The method according to claim 1, wherein the message comprising the time comprises a Message Authentication Code (MAC), and determining an authenticity of the message comprises:
   computing a Message Authentication Code at the user electronic device using a key stored at the user electronic device; and
   comparing the computed Message Authentication Code with the Message Authentication Code in the received message.

4. The method according to claim 1, wherein the user electronic device stores an identifier (ID) and the method comprises:
   sending a time request to the time source, the time request including the identifier (ID).

5. The method according to claim 1 wherein the message comprising the time comprises a digital signature and determining an authenticity of the message uses a public key of the time source.

6. The method according to claim 1, wherein the user electronic device is capable of computing a dynamic security code for a plurality of different cards, the user electronic device stores a master key, and computing the dynamic security code comprises deriving a key for a selected one of the cards using the master key.

7. The method according to claim 6, wherein computing the dynamic security code comprises deriving a key for the selected one of the cards using the master key and an additional per-card data element received from an authorization entity.

8. The method according to claim 1, wherein the user electronic device is capable of computing a dynamic security code for a plurality of different cards and the method comprises:
   causing the user electronic device to display an invitation for user input to select one of the plurality of cards; and
   sending a request to generate a dynamic security code for the selected card.

9. The method according to claim 1, wherein at least the step of computing the dynamic security code based on the time is performed by one of:
   a secure element on the user electronic device; and
   a secure partition of a general purpose processor of the user electronic device.

10. A system, comprising:
    a user electronic device; and
    an authorization entity,
    the user electronic device configured to generate a dynamic security code for securing a card transaction, the card transaction using card details comprising card information of a card used for the card transaction, the user electronic device being separate from the card, the user electronic device storing an identifier, and the user electronic device comprising:
       at least one processor,
       storage,
       a display, and
       a user input device;
    wherein the at least one processor of the user electronic device is configured to perform a preliminary enrolment process comprising:
       receiving, from the authorization entity, a set of partial data respectively associated with a set of cards issued to a user, each partial data allowing the user to identify a card of said cards respectively associated with a corresponding one of said partial data, receiving user input selecting one card among the set of cards, the selected card being selected based on the received partial data respectively associated with the selected card, and sending the identifier to the authorization entity;

wherein the identifier is usable to associate the selected card to key for dynamically computing a dynamic security code;

wherein the at least one processor of the user electronic device is further configured to:

receive, via the user input device, a request to generate the dynamic security code, upon receiving the user request, send a time request to a time source external to the user electronic device, receive, in response to the time request, a message comprising a time from the time source, determine an authenticity of the message containing the time, compute the dynamic security code as a function of the time received in the message and the key stored at the user electronic device, and cause the dynamic security code to be displayed on a display of the user electronic device; and wherein the authorization entity is configured to:

receive the card details of the card, including the dynamic security code computed by the user electronic device and other card data relative to the card, based on the other card data relative to the card, determine the identifier, determine a specific key based on the determined identifier, compute a verification code as a function of the specific key, and authorize the card transaction only when if the computed verification code and the received dynamic security code match.

11. The user electronic device according to claim 10, wherein the at least one processor is configured to only perform at least one of:

computing the dynamic security code, and causing the dynamic security code to be displayed if the message comprising the time is determined to be authentic.

12. The user electronic device according to claim 10, further comprising one of:

a secure element (210) on the user electronic device which is configured to compute the dynamic security code; and a secure partition of a general purpose processor of the user electronic device which is configured to compute the dynamic security code.

13. The method according to claim 1, wherein the user electronic device is one of: a smart phone, a tablet, and a personal computer.

14. The method according to claim 2, wherein the message comprising the time comprises a Message Authentication Code (MAC), and determining an authenticity of the message comprises:

computing a Message Authentication Code at the user electronic device using a key stored at the user electronic device; and comparing the computed Message Authentication Code with the Message Authentication Code in the received message.

15. The method according to claim 2, wherein the user electronic device stores an identifier and the method comprises:

sending a time request to the time source, the time request including the identifier.

16. The method according to claim 3, wherein the user electronic device stores an identifier and the method comprises:

sending a time request to the time source, the time request including the identifier.

17. The method according to claim 2, wherein the message comprising the time comprises a digital signature and determining an authenticity of the message uses a public key of the time source.

18. The method according to claim 2, wherein the user electronic device is capable of computing a dynamic security code for a plurality of different cards, the user electronic device stores a master key, and computing the dynamic security code comprises deriving a key for a selected one of the cards using the master key.

* * * * *